INVENTORS
GEORGE F. BISHOP
AMOS F. MOYER

June 11, 1940.  G. F. BISHOP ET AL  2,204,244
POWER GANG LAWN MOWER
Original Filed June 16, 1933  4 Sheets-Sheet 3

INVENTORS
GEORGE F. BISHOP
AMOS F. MOYER
By Paul, Paul & Moore
ATTORNEYS

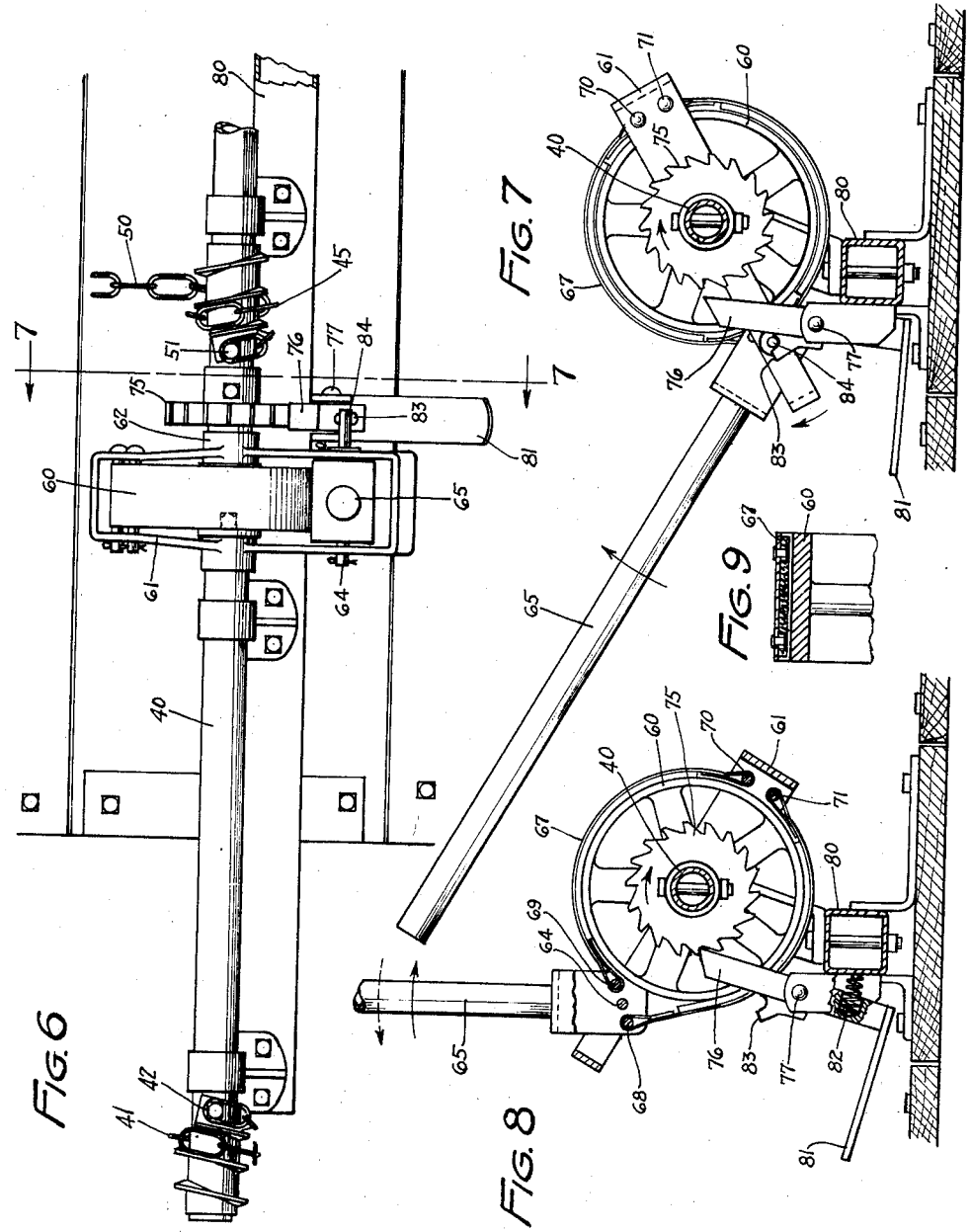

Patented June 11, 1940

2,204,244

UNITED STATES PATENT OFFICE 2,204,244

POWER GANG LAWN MOWER

George F. Bishop, San Francisco, Calif., and Amos F. Moyer, Minneapolis, Minn., assignors, by mesne assignments, to Toro Manufacturing Corporation of Minnesota, a corporation of Minnesota Application June 16, 1933, Serial No. 676,086
Renewed July 15, 1938

27 Claims. (Cl. 56—7)

This invention relates to improvements in equipment for operating lawn mowers, and has an important object to provide a power gang lawn mower, or apparatus, especially adapted for mowing relatively small city park lawns and other small lawn areas at various locations. The invention provides a device adapted to mow such small lawn areas, and further adapted to transport the mowing units through city streets in regular motor vehicle traffic, from one park or lawn area to the next, with the units raised from the ground, and entirely supported by the motor-driven vehicle, which controls the mowing units during the mowing operation.

Heretofore such lawn areas have been mowed by hand because each is too small to warrant the cost and maintenance of its own gang lawn mower. The present invention has resulted in large savings in the cost of mowing such small areas.

Another object of the invention is to equip the mower-carrying and controlling vehicle with large flexible walled tires of the socalled "air-wheel" variety, and to operate with the tires inflated to a very low pressure, for example ten to twelve pounds per square inch.

It has heretofore been proposed to use pneumatic tires of the ordinary type on motor driven vehicles operating mower units in gangs. It was found, however, that these tires damaged the grass to the extent of pressing out the juices. These juices wet the surface of the tires, and caused slippage. This slippage, once begun, continued, and spinning of the wheels caused burning.

We have found that by the use of large flexible tires of the so-called "air wheel" variety, and by inflating them only to a very low pressure such, for example, as ten to twelve pounds per square inch, "burning" or pressing out of the grass juices is avoided, and a satisfactory degree of traction is obtained. It has also been found that such tires, inflated in the manner described, are capable of mounting or climbing over relatively high obstructions such as curb stones, too high to be climbed when metal wheels of any feasible diameter are used, or when high pressure pneumatic tires of the ordinary type are used. This is of particular advantage, in that entry to the plot to be mowed can be made without need of roadway and therefore at any point from a street or road which the plot borders. By combining these discoveries, the present invention provides a mower-operating apparatus adapted to the triple purpose of traversing city streets in regular motor vehicle traffic with the mower units raised for transport purposes, mounting curb stone en-route to small park areas which have no special road entries, and avoidance of spinning of the tires which damages or burns the turf.

Other objects of the invention are: to provide means for quickly elevating the mowers individually and simultaneously; to so arrange such means as to be operable by the driver when seated in driving position; and to provide means by which free oscillation and lateral swinging of a rearmost unit is allowed when the unit is on the ground, but by which such movement is substantially prevented when the mower is raised from the ground.

Features include the use of large flexible tires with low deflation, and all details of construction pertaining to the mower unit raising and lowering means, along with the broader ideas of means inherent in the disclosure.

Objects, features and advantages of the invention will be set forth in the description of the drawings forming a part of this application, and in said drawings Figure 1 is a side elevation showing the mower-controlling vehicle in the act of mounting a curb stone;

Figure 6 is a plan view illustrating the mower-unit raising and lowering means;

Figure 7 is a vertical section taken substantially on line 7—7 of Figure 6, showing the parts positioned to allow the units to move to the ground position;

Figure 8 is a view substantially similar to Figure 7 but showing the parts positioned as during the unit-raising operation; and Figure 9 is a detail section showing the relation of the drum and band.

Numeral 1 indicates the frame of a motor driven vehicle. The wheels are indicated at 2.

Tires of the so-called "air wheel" variety inflated to a substantially low pressure such, for example, as from ten to twelve pounds per square inch are indicated at 3. Numeral 4 indicates the driver's seat which is arranged in operative relation to the steering wheel 5, shift lever 6 and pedal 7.

Associated with the vehicle and connected to be drawn thereby are a plurality of lawn mower units arranged to cut overlapping swaths. In this instance there are three mowing units, two located between the front and rear wheels to cut in front of the rear or tractor wheels, and the third rearwardly of the rear axle. The units are preferably symmetrically disposed relatively to the transverse middle of the vehicle.

Means is provided for separately operably attaching each unit to the vehicle to be drawn thereby, and so as to permit substantial lateral swinging motions of the unit when on the ground, and also to permit vertical swinging motions to permit the unit to be raised from the ground and entirely supported by the automobile.

Figure 1:
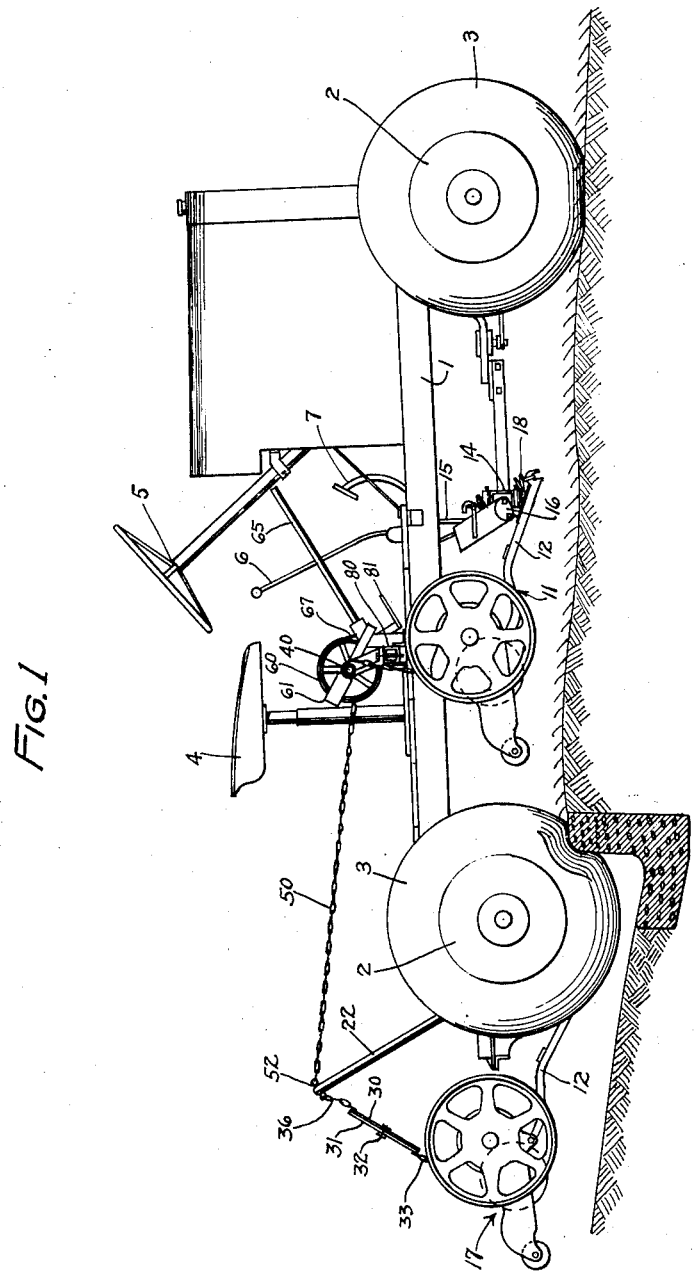
Figure 2:
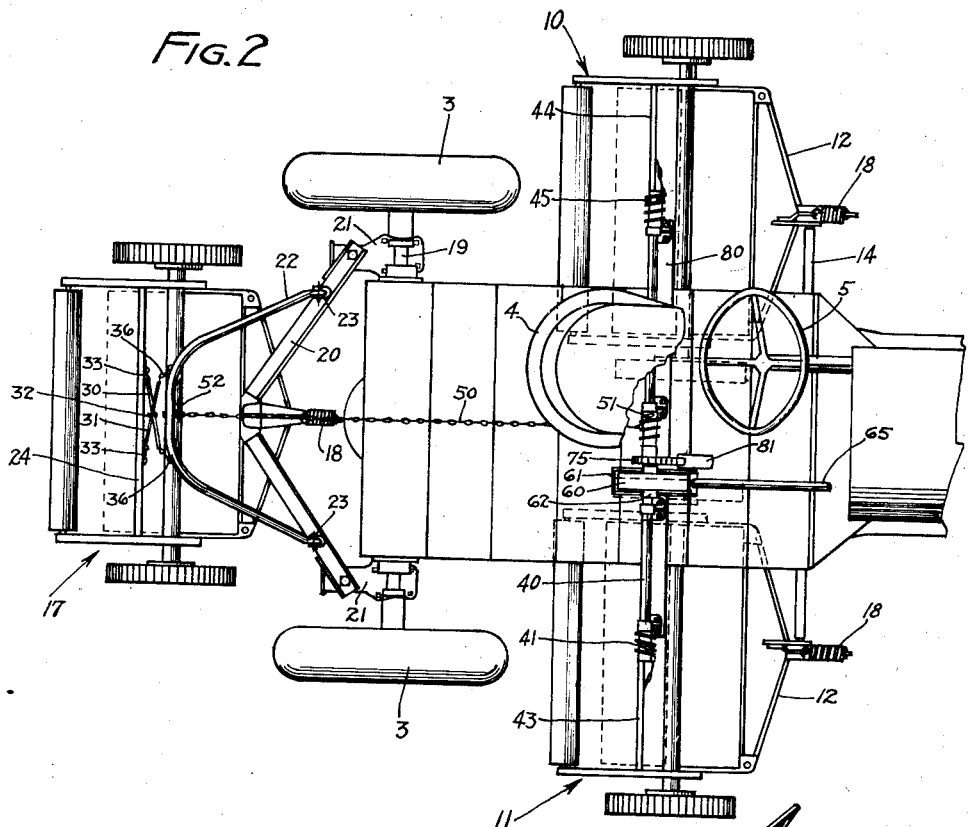
Figure 2 is a top plan view showing the arrangement of the mower units, and of the elevating apparatus, with the units in mowing position.
Figure 3:
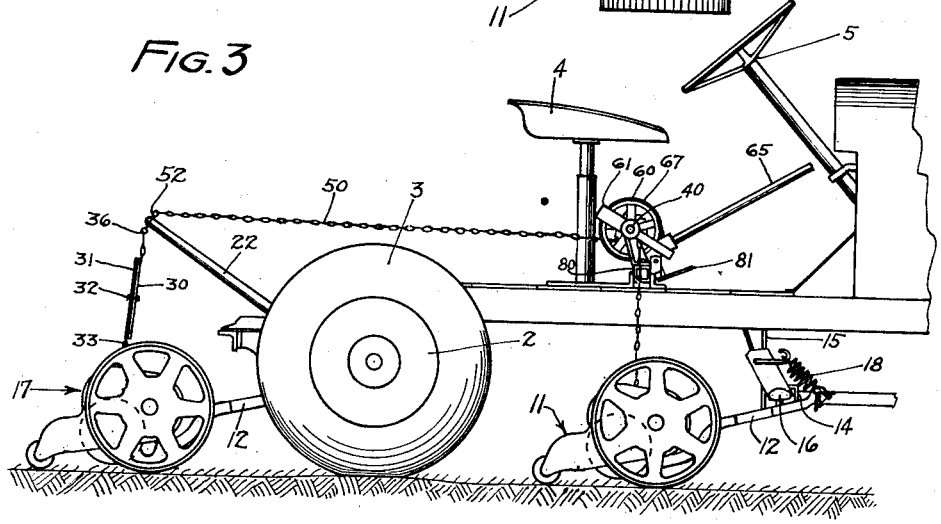
Figure 3 is a side elevation of the structure of Figure 2.

The front mowers are respectively generally indicated 10—11. Each mower has the usual frame, including a drawbar indicated at 12. Both mowers are connected to a bar 14 which is mounted to shift laterally, and which is controlled by the steering mechanism, not shown, to be shifted laterally in a direction corresponding to the direction of steering. This shifting construction is not in itself a feature of the present invention, but is covered in the copending application of Amos F. Moyer, for Power gang lawn mower, bearing Serial Number 669,818, which has matured into Patent 2,067,158, granted January 5, 1937. The shift bar is suitably secured to the chassis by means of brackets 15, see Figure 1. Each mower 10—11 has means connecting it to the shift bar 14. Each connection includes a ball and socket joint 16 of any preferred construction, the ball part of the joint being connected to the draw bar 12 of the corresponding mower unit. Whatever the actual structure of the joint, this universal connection is of a nature to permit horizontal and vertical motions of the unit—the horizontal motion to allow the mower to trail in the proper position conformably to the direction of movement of the vehicle, and vertical motion to allow the mowers to follow undulations of the ground while mowing and to be raised to the position shown in Figure 1. The draw bar 12 of the rear unit 17 is pivotally connected by a ball and socket joint 16 to an extension of stationary frame 20, see Figure 2. The frame 20 is suitably attached to socket elements 21 carried by the gear axle 19. The usual draw bar spring 18 is provided for each unit, as described in Patent No. 1,900,726.

Means is provided for simultaneously raising or lowering all units, and this means has an operating part which is accessible to and operable by the driver when seated and in driving position. A special raising means is provided for the rear unit, and to this end, there is mounted on the stationary frame 20, a somewhat U-shaped frame 22. This frame is pivoted as at 23 on transversely extending horizontal axes, to the members of frame 20 to swing vertically. The swing-frame 22 is connected with a cross bar 24 of the rear mower 17 by a linkage means operative to permit substantial lateral motions of the unit when on the ground, but to prevent substantial lateral motions when said unit is raised, or to prevent such degree of lateral motion as might result in damage to the unit, during vehicle travel at high speeds or over rough roads.

Figure 4:
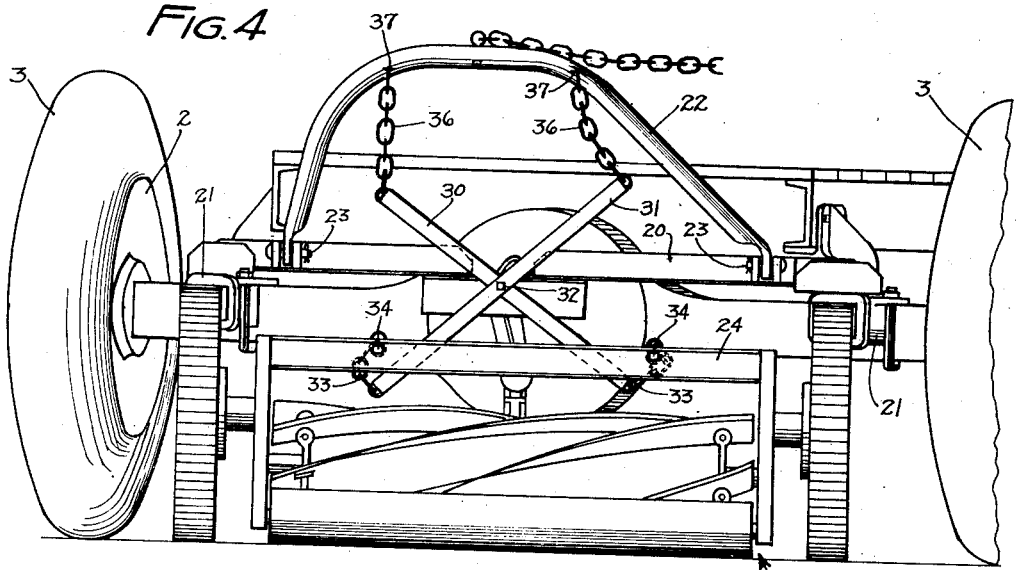
Figure 4 is a view showing the unit in mowing position and illustrating the action of the linkage portion of the unit-raising means, to permit a proper degree of horizontal lateral motion of the unit, when the vehicle is turning.
Figure 5:
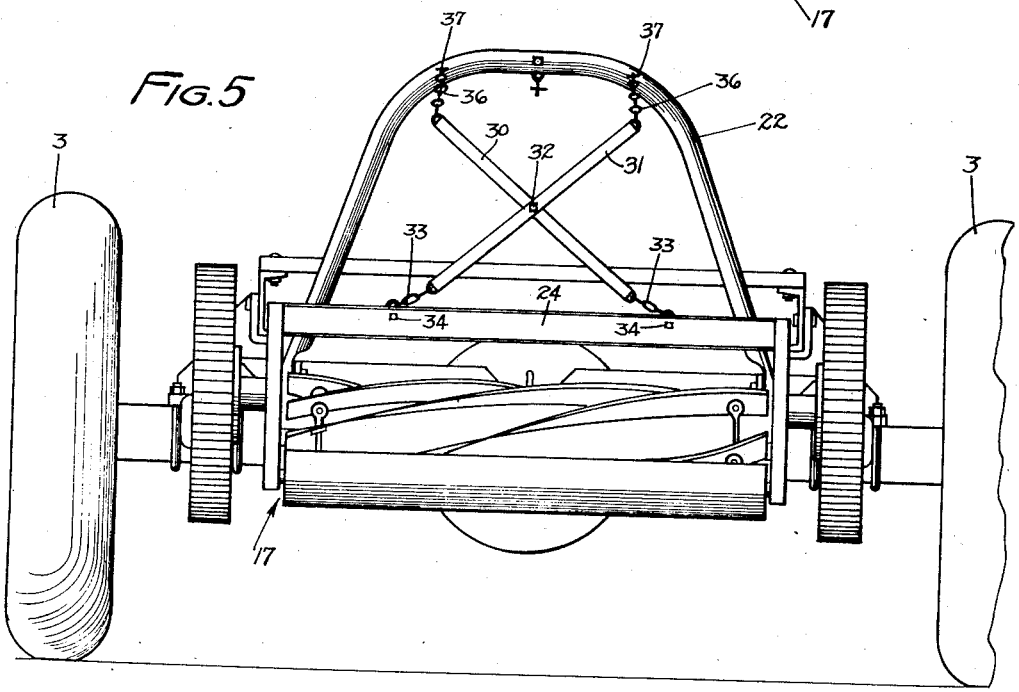
Figure 5 is a view showing the mowing unit raised, and illustrating the action of the linkage means to prevent lateral motion of the mower when in this position.

Referring to Figure 4: One form of means for performing this function comprises a pair of crossed arms 30—31 pivoted together as at 32. To the lower end of each arm 30—31 is attached by one end, a chain 33, or other flexible element the other end of which is connected as at 34 to the bar 24 of the unit 17. The upper end of each arm 30—31 has connected thereto, one end of a chain 36 the other end of which is connected as at 37 to the swinging frame 22. When the mower is on the ground as shown in Figure 4, and when the frame 22 is lowered sufficiently, the two chains 33 are loose, and proper lateral play is assured. However, when the frame 22 is raised, as shown in Figure 5, the mower is held suspended by the arms and chains and the chains assume taut condition, so that there is no dangerous degree of lateral play permitted, as would be the case if long chains extended from frame 22 to bar 24.

Referring to Figures 2, 6, 7 and 8: The means for simultaneously raising all mower units comprises, in this instance, a shaft 40 suitably journaled on the chassis of the vehicle in transverse relation to extend laterally therebeyond at each side. A chain 41 is connected by one end as at 42 to the shaft, and is connected by its opposite end, see Figure 2, to a cross bar 43 of the frame of mower 11. A chain 45 similarly connects the shaft 40 with a cross bar 44 of mower 10, and a chain 50 connected as at 51 to the shaft is in turn connected as at 52 to swing frame 22. The chains are so arranged that on rotation of the shaft in the proper direction, all mower frames are either raised or lowered, each mower-connecting draw bar 12 pivoting about its ball and socket joint 16.

Means is also provided for operating the shaft 40 to control raising and lowering of the units, and includes detent means for holding the shaft against unit-lowering motion, and means controlled by the shaft controlling means adapted to hold said detent means disengaged, to allow the control means to lower the unit, or units. To this end, shaft 40 has fixed thereto a brake drum 60. Upon the shaft is rockingly journaled as at 62 a rectangular frame 61 which circumscribes the drum, and is spaced therefrom as best shown in Figure 6. Pivoted to the frame as at 64 is a hand lever 65, the lever being so disposed that it can be manipulated by a driver seated in driving position on the seat 4. The pivot 64 is, in this instance, arranged on that end of the frame which is farthest from the driver's seat, so that unit-raising motion of the shaft occurs when the lever is pulled upwardly and rearwardly toward the driver's seat. A pair of brake bands, indicated at 67, are operatively associated with the drum, as shown, each band is pivoted by one end as at 68—69 to the lever in diametric relation to the pivot 64, see Figure 8. The opposite ends are pivoted to the frame at the opposite side as indicated at 70—71. In Figure 8, the lever has been swung to cause the bands to grip the drum, and as the lever is moved in the direction of the full line arrow, the shaft is turned also in the direction of the arrow to operate the chains to raise the mower units.

Detent means hold the shaft against unit-lowering motion. This means includes a ratchet wheel 75 fixed to the shaft 40, and a lever detent 76 pivoted at 77 to shaft-bearing-supporting member 80. This lever has a foot piece 81 by which it can be moved from detent position, and a spring 82 automatically urges the lever to ratchet-engaging or detent position. The lever is provided with a projection 83 with which the laterally projecting portion 84 or pivot 64 of lever 65 is engageable as shown in Figure 7, to hold the detent disengaged after the detent has been foot-operated to the released position of Figure 7.

With the parts positioned as in Figure 7, the lever can be manipulated to allow gradual slippage between the bands and drum, and thus permit the shaft to be turned as a result of gravity action of the units, so that the units can be carefully lowered to cutting position. Also, if lever 65 is supported by means of pin 84, in the position shown in Figure 7, while mowing, the brake band 67 will automatically be held entirely out of contact with drum 60 (see Figure 9), and any individual mower will be free to move downwardly into a depression in the ground by first causing its attached chain to revolve the shaft 40 in the lowering direction.

We claim as our invention:

1. In a device of the class described, a motor-driven vehicle, a mower unit, means operatively attaching the unit to the vehicle to be drawn thereby and to permit vertical swinging motion, a shaft on the vehicle, means by which the shaft controls raising and lowering of the unit, a lever, and means by which it controls the shaft to obtain raising or lowering of the unit, ratchet means for securing the shaft against rotation in unit-lowering direction including a detent, and means controlled by said shaft control means for holding the detent in release position while said shaft control means is manipulated to lower the unit.

2. In a device of the class described, a motor-driven vehicle, a mower unit, means operatively attaching the unit to the vehicle to be drawn thereby and to permit vertical swinging motion, a shaft on the vehicle having a brake drum fixed thereto, means by which the shaft controls raising and lowering of the unit, a frame pivoted to the shaft and circumscribing the drum, a lever pivoted to the frame, a pair of brake bands operatively associated with the drum and each pivoted by one end to the lever and having their opposite ends pivoted to the frame, ratchet means for securing the shaft against rotation in unit-lowering direction including a detent, and means movable with said frame for holding said detent in release position while the lever is manipulated to obtain slippage between bands and drum to lower the unit.

3. A gang lawn mowing apparatus comprising a motor-driven vehicle having front and rear wheels, the driving wheels having tires of relatively large diameter inflated to low pressure, a plurality of lawn mower units including the usual cutter-operating ground wheels, means separately operably attaching each unit to the vehicle to be directly supported and drawn thereby and so that each unit can be bodily entirely raised off of the ground and supported by the vehicle, and means for simultaneously raising all units, and securing them in raised position.

4. A gang lawn mowing apparatus comprising a motor-driven vehicle, a plurality of complete lawn mower units including the usual cutter-operating ground wheels arranged to cut overlapping swaths, one disposed rearwardly of the vehicle, and two disposed rearwardly of the front and forwardly of the rear wheels, means separately operably attaching each unit to the vehicle to be directly supported and drawn thereby and so that each unit can be bodily entirely raised off of the ground and supported by the vehicle, and means having a part accessible by the driver when seated in driving position, for simultaneously raising all units and securing them in raised position.

5. In a device of the class described, a motor-driven vehicle, a mower unit, means operatively attaching the unit to the vehicle to be drawn thereby and to permit of vertical swinging motion, a shaft on the vehicle and means by which it controls raising and lowering of the unit, means for controlling the shaft to raise or lower the unit, detent means for holding the shaft against unit lowering motion, and means controlled by said shaft controlling means adapted to hold the detent disengaged while said control means is operating to lower the unit.

6. In a device of the class described, a motor-driven vehicle having a driver's seat, a mower unit, means operatively attaching the unit to the vehicle to be drawn thereby and to permit of vertical swinging motions, a shaft on the vehicle, and means by which it controls raising and lowering of the unit, means adjacent the driver's seat for controlling the shaft to raise or lower the unit, detent means including a member automatically movable to hold the shaft against unit-lowering motion, and means controlled by said shaft-controlling means adapted to hold the detent disengaged while said control means is operating to lower the unit.

7. In a device of the class described, a motor-driven vehicle, a mower unit, means operatively attaching the unit to the vehicle to be drawn thereby and to permit vertical swinging motions, a shaft on the vehicle having a brake drum, means by which the shaft controls raising and lowering of the unit, means for controlling the drum to operate the shaft to raise or lower the unit, detent means for holding the shaft against unit-lowering motion, and means controlled by said drum-controlling means adapted to hold the detent disengaged while said control means is controlling the drum to lower the unit.

8. In combination with a vehicle, a lawn mower unit, means operatively attaching the unit to the vehicle to be drawn thereby and to permit of lateral and vertical swinging motions of the unit, means on the vehicle for raising the unit off the ground, including linkage means operative to permit substantial lateral motions of the unit when on the ground, but to prevent substantial lateral motions when the said unit is raised.

9. In combination with a vehicle, a lawn mower unit, means operatively attaching the unit to the vehicle to be drawn thereby and to permit of lateral and vertical swinging motions of the unit, means on the vehicle for raising the unit off the ground, and crossed pivoted-together arms and flexible elements connecting the arms to the last mentioned means and to the lawn mower, and operative to permit substantial lateral motions of the unit when the unit is on the ground but to prevent substantial lateral motions when the said unit is raised.

10. In combination with a vehicle, a lawn mower unit, means operatively attaching the unit to the vehicle to be drawn thereby and in a manner to be swung to a position off of the ground including means adapted to permit substantial lateral motions of the unit when on the ground, but to prevent lateral motions when raised from the ground, and means for operating the unit-raising means to raise and lower said means, and to secure said means in raised position.

11. A power gang lawn mower comprising a power-driven vehicle, a multiplicity of overlapping lawn mower units connected thereto each including the usual cutter-operating ground wheels, certain of said units being disposed behind the rear axle of said tractor, a lift member carried on the tractor extending behind said axle and pivoted to swing on a transverse axis, tension means including crossed pivotally connected members flexibly connecting the lift member to one of said units and actuating means adjacent the driver's position on said vehicle for operating the lift member to elevate said unit.

12. A power gang lawn mower comprising a power-driven vehicle, a multiplicity of overlapping lawn mower units connected thereto each including the usual cutter-operating ground wheels, certain of said units being disposed behind the rear axle of said tractor, a hoisting device extending rearwardly of said axle, tension means including crossed pivotally connected members flexibly connecting the hoisting device with one of said units, and actuating means adjacent the driver's position on said vehicle connected to operate said tension means from the hoisting device for lifting said unit.

13. In a power gang lawn mower comprising a tractor and a multiplicity of mowing units under and connected thereto each including the usual cutter-operating ground wheels, a transverse shaft on the tractor, several tension means respectively connected to the individual units and extending directly from each unit to and operably connected with said shaft, and means adjacent the driver's position to revolve said shaft, thereby operating said tension means to lift the units.

14. A gang lawn mower apparatus comprising an automobile, a pair of complete mower units aligned transversely of the automobile and arranged between the front and rear wheels and projecting laterally and arranged to cut swaths at points laterally beyond the tread lines of the wheels, means for securing each unit to the chassis to be drawn thereby, means permitting the unit as a whole to be swung well upwardly off of the ground toward the chassis to be entirely supported thereby, a complete mower unit arranged at the rear of the automobile to cut an overlapping swath with the first mentioned mower units, and means connecting said unit to the chassis to permit it to be raised bodily well off of the ground and means on the automobile for swinging the units clear of the ground, said automobile having tires of the "air wheel" type inflated to ten to twelve pounds pressure.

15. In combination with an automobile, a lawn mower unit attached to the automobile to be raised bodily and swing laterally, a frame pivoted to the automobile and linkage means connecting the frame with the unit to raise it, including a pair of crossed bars centrally pivoted together, and flexible means attaching corresponding pairs of ends of said bars in spaced relation respectively to the unit and to the frame, said linkage means acting when the unit is in lowered or ground position to allow lateral motions of the same, and when in raised position to substantially prevent lateral motions, and means on the automobile for operating the frame.

16. A gang lawn mower apparatus comprising a motor-driven vehicle, mower units arranged beneath the vehicle between the front and rear wheels to cut overlapping swaths and each including the usual cutter-operating ground wheels, means for each unit permanently individually pivotally connecting it for universal motion to a separate point of the vehicle, each connection permitting the entire unit to be raised a substantial distance from the ground, means for each unit permanently connected thereto for raising it bodily, and means for operating the raising means.

17. A gang lawn mower apparatus comprising a motor-driven vehicle, complete mower units arranged beneath the vehicle intermediately of front and rear wheels thereof to cut overlapping swaths and each including the usual cutter-operating ground wheels, means for each unit permanently individually pivotally connecting it to a separate point of the vehicle, each connection permitting the entire unit to be raised a substantial distance from the ground, means for each unit connected thereto for raising it bodily, and means for operating the raising means, said vehicle having tire of the "air wheel" type inflated from ten to twelve pounds pressure.

18. A gang lawn mower apparatus comprising a motor-driven vehicle, a pair of complete mowing units arranged transversely of the vehicle rearwardly of the front and forwardly of the rear wheels, a complete mower unit arranged rearwardly of the rear axle, said units being arranged to cut overlapping swaths and each including the usual cutter-operating ground wheels, means for each unit permanently individually pivotally connecting it for universal motion to a separate point of the vehicle, each connection permitting the entire unit to be raised a substantial distance from the ground, means for each unit permanently connected thereto for raising it bodily, and means for operating the raising means.

19. A gang lawn mower apparatus comprising a motor-driven vehicle, a pair of complete mowing units arranged transversely of the vehicle rearwardly of the front and forwardly of the rear wheels, a complete mower unit arranged rearwardly of the rear axle, said units being arranged to cut overlapping swaths and each including the usual cutter-operating ground wheels, means for each unit permanently individually pivotally connecting it for universal motion to a separate point of the vehicle, each connection permitting the entire unit to be raised a substantial distance from the ground, means for each unit permanently connected thereto for raising it bodily and means for operating the raising means, said vehicle having tires of the "air wheel" type inflated from ten to twelve pounds pressure.

20. A gang lawn mower apparatus comprising a motor-driven vehicle, a pair of complete mowing units arranged transversely of the vehicle rearwardly of the front and forwardly of the rear wheels, a complete mower unit arranged rearwardly of the rear axle, said units being arranged to cut overlapping swaths and each including the usual cutter-operating ground wheels, means for each unit permanently individually pivotally connecting it for universal motion to a separate point of the vehicle, the pivotal point for each unit being forwardly of the axle of the mower, each connection permitting the entire unit to be raised a substantial distance from the ground, means for each unit permanently connected thereto for raising it bodily, and means for simultaneously operating all raising means.

21. A gang lawn mower apparatus comprising a motor-driven vehicle, a pair of complete mowing units aligned transversely of the vehicle rearwardly of the front and forwardly of the rear wheels and projecting laterally beyond the tread line of the wheels, a complete mower unit arranged rearwardly of the rear axle, said units being arranged to cut overlapping swaths, means for each unit permanently individually pivotally connecting it for universal movement to a separate point of the vehicle, the pivotal point for each unit being forwardly of the axle of the mower unit and at the same distance from said axle, each connection permitting the entire unit to be raised a substantial distance from the ground, means for each unit permanently connected thereto for raising it bodily, said means capable of permitting sufficient slack to allow natural adjustments of the mower during cutting, and means operable from a driver's seat for operating the raising means, the rear or driving wheels having tires of the air wheel type inflated to low pressure.

22. A gang lawn mower apparatus comprising a motor driven vehicle having front and rear wheels, having tires of the air wheel type inflated to low pressure, mower units arranged to cut overlapping swaths and each including the usual cutter-operating ground wheels, some of the units being arranged rearwardly of the front wheels and forwardly of the rear wheels, means for each unit permanently pivotally connecting it for universal movement to the vehicle, the lateral movements thereof being limited by the location of said pivotal connections relatively to each unit and relatively to the vehicle, said connections permitting each entire unit to be raised a substantial distance from the ground, means for each unit permanently connected thereto and extending directly from the vehicle to the unit for raising said unit bodily, and means on said vehicle for operating said raising means.

23. A gang lawn mower apparatus comprising a motor driven vehicle having forward and rear wheels the driving wheels having tires of relatively large diameter inflated at low pressure, said vehicle having thereon a driver's station from which operation of the vehicle is controlled, a plurality of mower units arranged for gang cutting, each unit having cutter driving ground wheels, and at least one of the units being arranged intermediately between the forwardly and rearwardly arranged wheels and beneath the chassis, means separately operably attaching each unit to the vehicle to permit the entire unit to be raised sufficiently to avoid obstructions, and means for simultaneously raising or lowering the units and operable by a driver while at the control station, said last mentioned means being permanently operatively connected to the units.

24. A gang lawn mower apparatus comprising a motor driven vehicle having forward and rear wheels the driving wheels having tires of relatively large diameter inflated at low pressure, said vehicle having thereon a driver's station from which operation of the vehicle is controlled, a plurality of mower units arranged for gang cutting, each unit having cutter driving ground wheels and at least one of the units being arranged intermediately between the forwardly and rearwardly arranged wheels and beneath the chassis, means separately operably attaching each unit to the vehicle to permit the entire unit to be raised sufficiently to avoid obstructions, and means for simultaneously raising or lowering the units and operable by a driver while at the control station.

25. A gang lawn mower apparatus comprising an automobile having the usual front and rear wheels, complete mower units arranged beneath the vehicle between the front and rear wheels, means for each unit permanently individually pivotally connecting it for universal motion to a separate point of the vehicle, each connection permitting the entire unit to be bodily raised a substantial distance from the ground, and means for simultaneously raising the units including a flexible element attached to each unit, the connection being slack when the units are on the ground to permit lateral motions thereof.

26. In combination with an automobile having a chassis, a gang of ground wheel actuated lawn mower units each having an individual draft member universally connected to the chassis, movable means on the chassis, flexible members connected from each of said units upward to the chassis and joined to said movable means, a load moving actuator and a holding device for said movable means, whereby movement of said means may lift and carry the unit ground wheels at a substantial height from the ground by tension in said flexible members, and means to gradually lower said flexible members and units by gravity without reverse action of said actuator.

27. A gang lawn mowing apparatus comprising a motor-driven vehicle having front and rear wheels, the driving wheels having tires of relatively large diameter inflated to low pressure, a plurality of lawn mower units including the usual cutter-operating ground wheels, means separably operably attaching each unit to the vehicle to be drawn thereby and so that each unit can be bodily raised entirely off the ground, operable permanently connected flexible means connecting each unit to the vehicle to be directly supported thereby so that each unit can be bodily raised off the ground, and means for simultaneously raising all units and securing them in raised position.

GEORGE F. BISHOP.
AMOS F. MOYER.